(12) United States Patent
Harada et al.

(10) Patent No.: US 10,008,756 B2
(45) Date of Patent: Jun. 26, 2018

(54) DIELECTRIC CONTACTLESS TRANSMISSION DEVICE AND CONTACTLESS TRANSMISSION METHOD

(71) Applicant: UBE INDUSTRIES, LTD., Yamaguchi (JP)

(72) Inventors: Nobuhiro Harada, Yamaguchi (JP); Yoshiaki Fujiyama, Yamaguchi (JP)

(73) Assignee: UBE INDUSTRIES, LTD., Yamaguchi (JP)

( * ) Notice: Subject to any disclaimer, the term of this patent is extended or adjusted under 35 U.S.C. 154(b) by 12 days.

(21) Appl. No.: 15/318,810

(22) PCT Filed: Jun. 23, 2015

(86) PCT No.: PCT/JP2015/068055
§ 371 (c)(1),
(2) Date: Dec. 14, 2016

(87) PCT Pub. No.: WO2015/199077
PCT Pub. Date: Dec. 30, 2015

(65) Prior Publication Data
US 2017/0141449 A1    May 18, 2017

(30) Foreign Application Priority Data

Jun. 25, 2014    (JP) .................................. 2014-130039

(51) Int. Cl.
*H01P 1/205*    (2006.01)
*H01P 5/02*    (2006.01)
(Continued)

(52) U.S. Cl.
CPC ................... *H01P 5/02* (2013.01); *H01P 7/10* (2013.01); *H02J 50/05* (2016.02); *H02J 50/12* (2016.02)

(58) Field of Classification Search
CPC .................................. H01P 1/202; H01P 7/04
(Continued)

(56) References Cited

U.S. PATENT DOCUMENTS

| | | | | |
|---|---|---|---|---|
| 5,493,261 A | * | 2/1996 | Kitoh | H01P 1/205 333/206 |
| 7,538,728 B1 | * | 5/2009 | Chang | H01Q 9/0485 343/700 MS |
| 9,577,477 B2 | * | 2/2017 | Fujiyama | H01P 7/10 |

FOREIGN PATENT DOCUMENTS

| | | |
|---|---|---|
| JP | 2012-085234 | 4/2012 |
| JP | 2014-003773 | 1/2014 |

OTHER PUBLICATIONS

International Search Report, PCT/JP2015/068055, dated Jul. 28, 2015.

* cited by examiner

*Primary Examiner* — Dean Takaoka
(74) *Attorney, Agent, or Firm* — Young & Thompson

(57) ABSTRACT

A dielectric contactless transmission device provided with a pair of ¼ wavelength dielectric resonance components (2, 3) having: dielectric blocks (20, 30) that have a first surface (20a), a second surface (20b), third to sixth surfaces (20c-20f) connecting the first surface (20a) and the second surface (20b), and a resonance hole (20g) for making the first surface (20a) and the second surface (20b) communicate; intra-resonance hole conductors (21, 31) covering the inner surface of the resonance hole (20g); external conductors (22, 32) covering the second surface (20b) and the third to sixth surfaces (20c-20f), the external conductors (22, 32) being connected to one end of the intra-resonance hole conductors; and coupling electrodes (23, 33) arranged on the first surface (20a) while being isolated from the external conductors (22, 32) and connected to the other end of the intra-resonance
(Continued)

hole conductors (21, 31), the first surfaces (20*a*) being arranged facing each other so that the coupling electrodes (23, 33) of the pair of ¼ wavelength dielectric resonance components (2, 3) are capacitively coupled.

6 Claims, 9 Drawing Sheets

(51) Int. Cl.
    *H01P 7/10*           (2006.01)
    *H02J 50/05*         (2016.01)
    *H02J 50/12*         (2016.01)
    *H01P 7/04*          (2006.01)

(58) Field of Classification Search
    USPC .............................................. 333/24 C, 206
    See application file for complete search history.

DIELECTRIC CONTACTLESS TRANSMISSION DEVICE AND CONTACTLESS TRANSMISSION METHOD

TECHNICAL FIELD

The present invention relates to a dielectric contactless transmission device and a contactless transmission method that can transmit a transmission object such as power or information in a non-contact manner between a pair of resonance components configured from dielectric blocks.

BACKGROUND ART

In recent years, contactless transmission devices in which two resonance components are closely arranged without wiring cables and the like and which perform data communication in a non-contact manner, and contactless transmission methods have attracted attention. Further, among such contactless transmission devices and contactless transmission methods, there are those that handle power as the transmission object, and contactless power feeding without a power supply cable has been attempted.

In such a situation, a dielectric contactless transmission device using dielectric material as the transmission/reception unit for a transmission object in order to improve transmission efficiency of the contactless transmission device is known (for example, see Patent Documents 1 and 2).

For example, Patent Document 1 discloses a dielectric contactless transmission device that respectively covers two resonance components (dielectric resonance components) formed of dielectric material with shielding cases each of which has an opening so that the openings face each other, and causes the openings to perform electromagnetic field coupling, thereby to realize wireless transmission of power. The dielectric resonance component described in Patent Document 1 reduces loss by covering the dielectric resonance components with the shielding cases, thereby to improve the unloaded Q value and improve power transmission efficiency.

Further, Patent Document 2 discloses a dielectric contactless transmission device in which microstrip resonance elements each of which has a ground electrode and a resonance electrode arranged on the front and back surfaces of a dielectric substrate are produced, and the two microstrip resonance elements are arranged to cause the resonance electrodes to face each other. The dielectric contactless transmission device described in Patent Document 2 sets both of the two microstrip resonance elements to have a size equal to ⅓ to ½ of the wavelength of a high frequency signal, thereby to secure favorable transmission efficiency.

Patent Document 1: Japanese Unexamined Patent Application, Publication No. 2014-003773

Patent Document 2: Japanese Unexamined Patent Application, Publication No. 2012-085234

DISCLOSURE OF THE INVENTION

Problems to be Solved by the Invention

By the way, in recent years, in addition to the improvement of transmission efficiency, there has also been a demand for the downsizing and reduction of cost of dielectric contactless transmission devices. However, for example, the dielectric contactless transmission device described in Patent Document 1 has problems in that downsizing is difficult because the dielectric contactless transmission device has a configuration to cover the dielectric resonance components with the shielding cases having an opening, and the reduction of cost is difficult because the number of components is increased. Further, the dielectric contactless transmission device described in Patent Document 2 has problems in that significant downsizing is difficult because the microstrip resonance elements are set to have the ⅓ to ½ wavelength, and the reduction of cost is difficult because a laminate structure is required to attach an input/output electrode.

The present invention has been made in view of the above-described problems and an objective is to provide, in a dielectric contactless transmission device using dielectric material for a transmission/reception unit for a transmission object such as power or information, a small and cheap dielectric contactless transmission device and a contactless transmission method of the same.

Means for Solving the Problems

According to the present invention, as those that achieve the objective as described above, a dielectric contactless transmission device capable of transmitting a transmission object in a non-contact manner is provided, the dielectric contactless transmission device including:

a pair of ¼ wavelength dielectric resonance components, each of the ¼ wavelength dielectric resonance components including a dielectric block including one surface, the other surface positioned at a side opposite to the one surface, a connection surface that connects an outer peripheral edge of the one surface and an outer peripheral edge of the other surface, and a resonance hole that makes the one surface and the other surface communicate;

an intra-resonance hole conductor covering an inner surface of the resonance hole;

an external conductor covering the other surface and the connection surface of the dielectric block, and connected to one end of the intra-resonance hole conductor; and a coupling electrode arranged on the one surface in a state of being isolated from the external conductor, and connected to the other end of the intra-resonance hole conductor, wherein the one surfaces are arranged to face each other so that the coupling electrodes of the pair of ¼ wavelength dielectric resonance components are capacitively coupled.

In one aspect of the present invention, it is favorable that at least one of the pair of ¼ wavelength dielectric resonance components includes an input/output electrode arranged on the one surface to be isolated from the external conductor, and capacitively coupled with a resonator configured from the dielectric block, and the input/output electrode is connected to an external circuit.

Further, in one aspect of the present invention, it is favorable that the external conductor includes a notch portion exposing a part of the connection surface, the input/output electrode includes an input/output terminal portion arranged to be isolated from the external conductor, inside the notch portion, and the input/output terminal portion is connected to the external circuit.

Further, in one aspect of the present invention, it is favorable that at least one of the pair of ¼ wavelength dielectric resonance components includes an excitation hole making the one surface and the other surface communicate approximately in parallel to the resonance hole, and inductively coupled with a resonator configured from the dielectric block, and an intra-excitation hole conductor covering the inner surface of the excitation hole, and connected to an external circuit.

Further, in one aspect of the present invention, it is favorable that the external conductor includes a notch portion continuously exposing a part of the other surface and a part of the connection surface, an input/output terminal portion is arranged to be isolated from the external conductor, inside the notch portion, and connected to the intra-excitation hole conductor, and the input/output terminal portion is connected to the external circuit.

Further, according to the present invention, as those that achieve the objective as described above, a contactless transmission method for enabling transmission of a transmission object in a non-contact manner is provided, the method including: arranging one surface of a first ¼ wavelength dielectric resonance component including a first dielectric block including the one surface, the other surface positioned at a side opposite to the one surface, a connection surface connecting an outer peripheral edge of the one surface and an outer peripheral edge of the other surface, and a resonance hole making the one surface and the other surface communicate, a first intra-resonance hole conductor covering an inner surface of the resonance hole, a first external conductor covering the other surface and the connection surface of the first dielectric block, and connected to one end of the first intra-resonance hole conductor, and a first coupling electrode arranged on the one surface and connected to the other end of the first intra-resonance hole conductor, and one surface of a second ¼ wavelength dielectric resonance component including a second dielectric block including the one surface, the other surface positioned at a side opposite to the one surface, a connection surface connecting an outer peripheral edge of the one surface and an outer peripheral edge of the other surface, and a resonance hole making the one surface and the other surface communicate, a second intra-resonance hole conductor covering an inner surface of the resonance hole, a second external conductor covering the other surface and the connection surface of the second dielectric block, and connected to one end of the second intra-resonance hole conductor, and a second coupling electrode arranged on the one surface and connected to the other end of the second intra-resonance hole conductor to face each other; and capacitively coupling the first coupling electrode and the second coupling electrode, and transmitting the transmission object.

Effects of the Invention

According to the present invention, in a dielectric contactless transmission device using dielectric material as a transmission/reception unit for a transmission object such as power or information, a small and cheap dielectric contactless transmission device and a contactless transmission method of the same can be provided by using a pair of ¼ wavelength dielectric resonance components having a predetermined shape.

Figure 1:
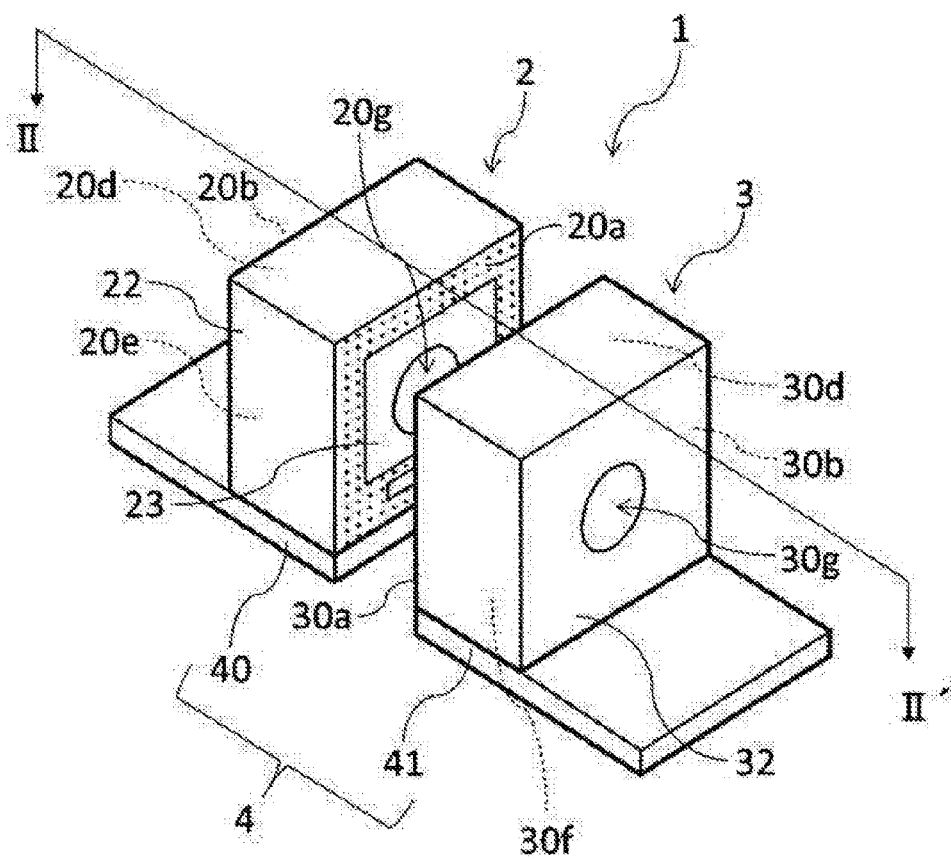
FIG. 1 is a perspective view schematically illustrating a dielectric contactless transmission device according to a first embodiment of the present invention.

EXPLANATION OF REFERENCE NUMERALS 1 and 1A Dielectric contactless transmission device
2 and 2A First ¼ wavelength dielectric resonance component (a pair of ¼ wavelength dielectric resonance components)
3 and 3A Second ¼ wavelength dielectric resonance component (a pair of ¼ wavelength dielectric resonance components)
4 and 4A Substrate
20 and 20A First dielectric block
20a First surface (one surface)
20b Second surface (the other surface)
20c Third surface (connection surface)
20d Fourth surface (connection surface)
20e Fifth surface (connection surface)
20f Sixth surface (connection surface)
20g Resonance hole
20h Excitation hole
21 First intra-resonance hole conductor (intra-resonance hole conductor)
22 First external conductor (external conductor)
23 First coupling electrode (coupling electrode)
24 First input/output electrode
25 First intra-excitation hole conductor
30 and 30A Second dielectric block
30a First surface (one surface)
30b Second surface (the other surface)
30c Third surface (connection surface)
30d Fourth surface (connection surface)
30e Fifth surface (connection surface)
30f Sixth surface (connection surface)
30g Resonance hole
30h Excitation hole
31 Second intra-resonance hole conductor (intra-resonance hole conductor)
32 Second external conductor (external conductor)
33 Second coupling electrode (coupling electrode)
34 Second input/output electrode
35 Second intra-excitation hole conductor
40 and 40A First substrate
41 and 41A Second substrate
42 and 42A Ground electrode
43 and 43A Signal line 45 and 45A Ground electrode
46 and 46A Signal line

PREFERRED MODE FOR CARRYING OUT
THE INVENTION

Hereinafter, dielectric contactless transmission devices 1 and 1A according to embodiments of the present invention will be described with reference to FIGS. 1 to 9. The dielectric contactless transmission devices 1 and 1A according to the present embodiment are contactless transmission devices using a pair of ¼ wavelength dielectric resonance components (also referred to as "coaxial type dielectric resonators"). Hereinafter, the dielectric contactless transmission devices 1 and 1A according to the present embodiment will be specifically described.

FIRST EMBODIMENT

Figure 2:
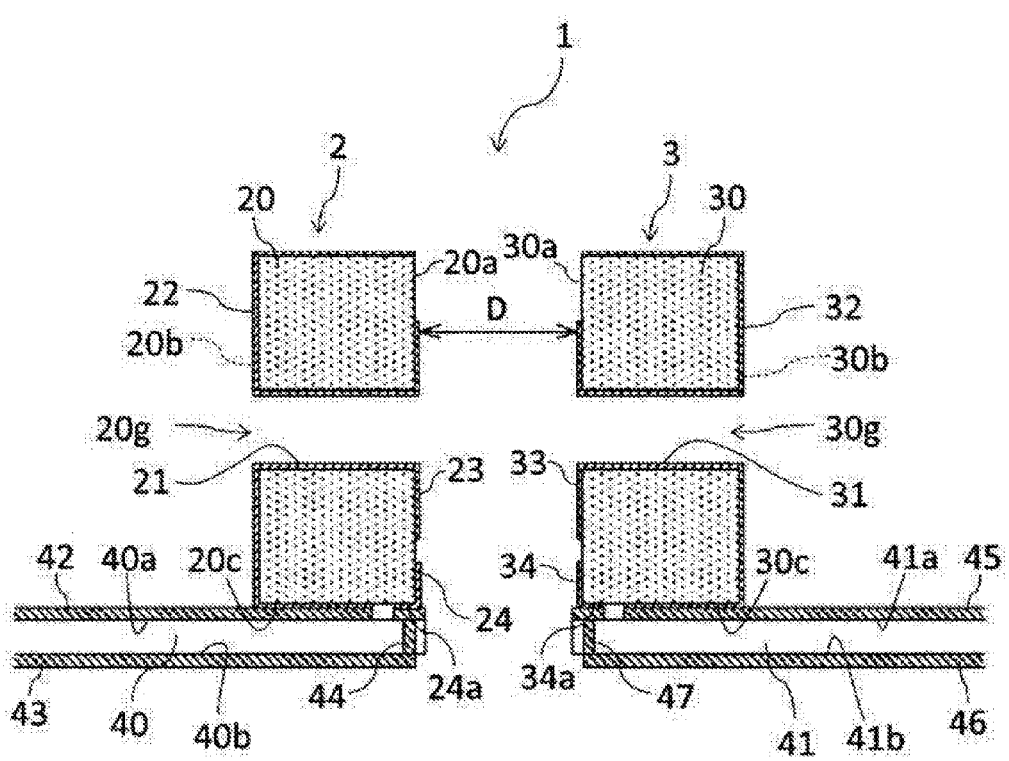
FIG. 2 is the II-II' sectional view of the dielectric contactless transmission device illustrated in FIG. 1.
Figure 3:
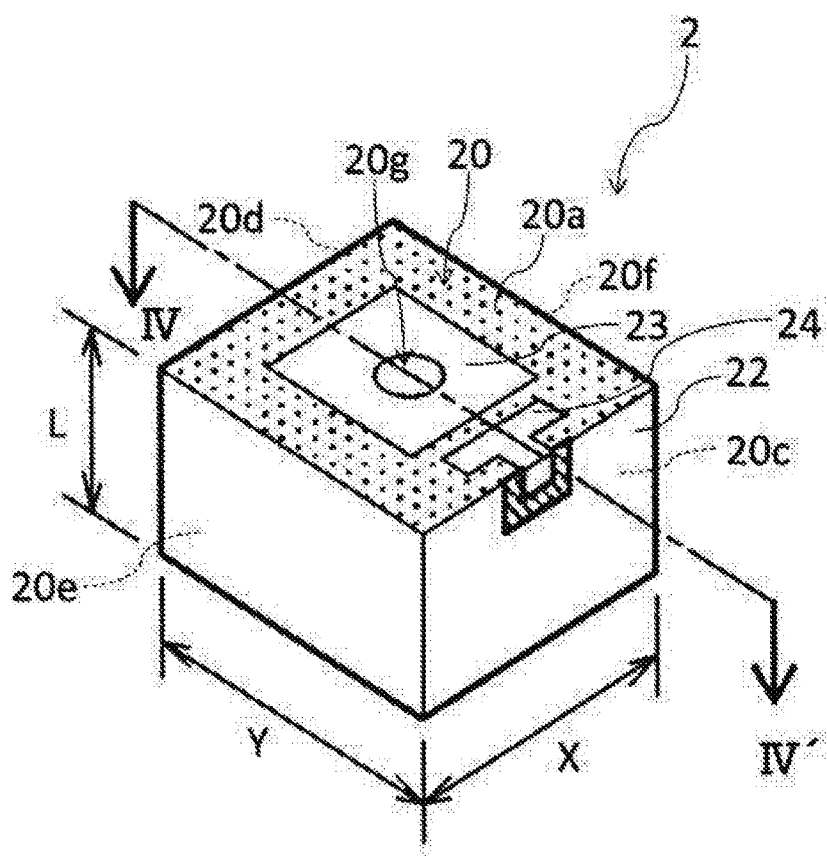
FIG. 3 is a perspective view schematically illustrating a first ¼ wavelength dielectric resonance component according to the first embodiment.
Figure 4:
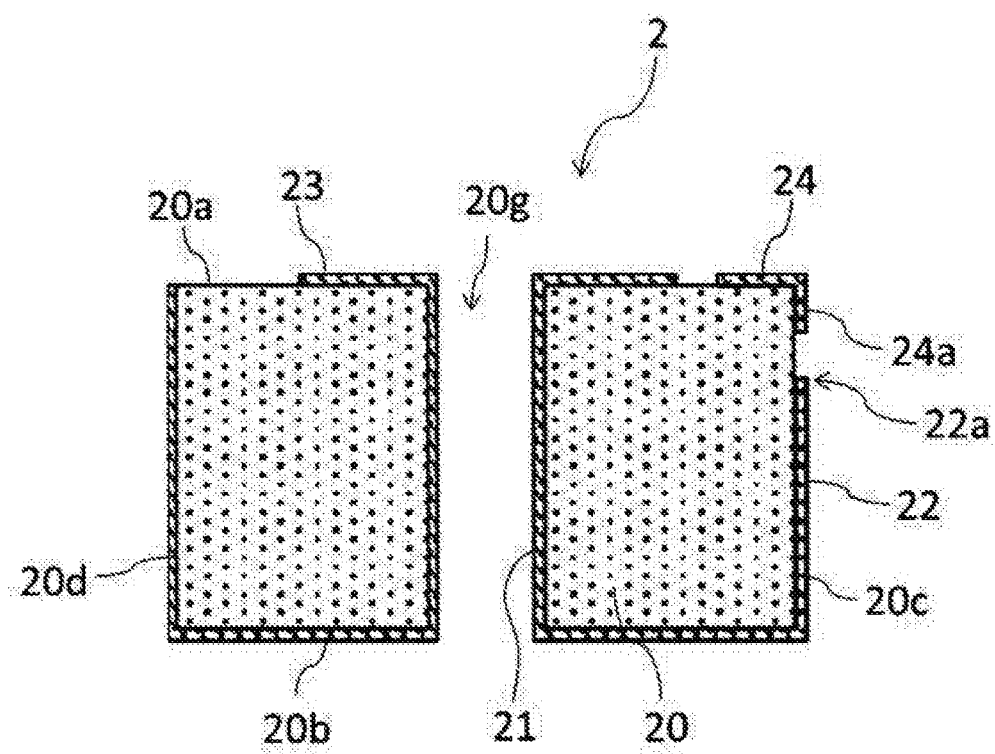
FIG. 4 is the IV-IV' sectional view of the first ¼ wavelength dielectric resonance component illustrated in FIG. 3.

First, the dielectric contactless transmission device 1 according to the first embodiment will be described with reference to FIGS. 1 to 4. FIG. 1 is a perspective view schematically illustrating the dielectric contactless transmission device 1 according to the first embodiment of the present invention. FIG. 2 is the II-II' sectional view of the dielectric contactless transmission device 1 illustrated in FIG. 1. FIG. 3 is a perspective view schematically illustrating a first ¼ wavelength dielectric resonance component 2 according to the first embodiment. FIG. 4 is the IV-IV' sectional view of the first ¼ wavelength dielectric resonance component 2 illustrated in FIG. 3.

As illustrated in FIGS. 1 and 2, the dielectric contactless transmission device 1 includes a first ¼ wavelength dielectric resonance component 2 and a second ¼ wavelength dielectric resonance component 3 (a pair of ¼ wavelength dielectric resonance components) that are formed to have a ¼ of the wavelength of the resonance frequency, and a substrate 4 on which the first ¼ wavelength dielectric resonance component 2 and the second ¼ wavelength dielectric resonance component 3 are mounted.

As illustrated in FIGS. 3 and 4, the first ¼ wavelength dielectric resonance component 2 includes a first dielectric block 20, a first intra-resonance hole conductor 21, a first external conductor 22, a first coupling electrode 23, and a first input/output electrode 24.

The first dielectric block 20 includes a first surface 20a and a second surface 20b approximately parallel to each other, a third surface 20c and a fourth surface 20d approximately perpendicular to the first surface 20a and the second surface 20b, and approximately parallel to each other, a fifth surface 20e and a sixth surface 20f approximately perpendicular to the first surface 20a and the second surface 20b and to the third surface 20c and the fourth surface 20d, and approximately parallel to each other, and a resonance hole 20g that makes the first surface 20a and the second surface 20b communicate.

The first surface 20a and the second surface 20b are positioned opposite to each other at a distance L, and the third surface 20c and the fourth surface 20d are positioned opposite to each other at a distance Y. Further, the fifth surface 20e and the sixth surface 20f are positioned opposite to each other at a distance X. In the present embodiment, the distance X=the distance Y=about 18 mm, and the distance L=about 8.4 mm are set, and the first dielectric block 20 is formed into an approximately rectangular parallelepiped shape. As described above, in the first dielectric block 20 according to the present embodiment, the second surface (the other surface) 20b positioned at the side opposite to the first surface 20a serves as the back surface, and the third to sixth surfaces (connection surface) 20c to 20f that connect the outer peripheral edges of the first surface 20a and the second surface 20b serve as peripheral surfaces, where the first surface (one surface) 20a is the front surface, for example.

The resonance hole 20g configures a through hole that penetrates the interior of the first dielectric block 20 from the first surface 20a to the second surface 20b approximately in parallel to the third to sixth surfaces 20c to 20f. Further, the resonance hole 20g is provided approximately in the center of the first surface 20a.

Note that the size of the first dielectric block 20 can be appropriately set according to a necessary characteristic, and the distance L (=$c_0/4f\sqrt{\in_r}$, $c_0$: velocity of light and $\in_r$: dielectric constant) is set to be a ¼ of the wavelength of the resonance frequency f of the resonance component.

For example forsterite-based ceramic that contains $Mg_2SiO_4$ as the chief element and is a dielectric ceramic with a dielectric constant $\in_r$ of about 10 can be used as the material of the first dielectric block 20. Note that the material of the first dielectric block 20 is not limited to the ceramic, and may be, for example, material made of a resin or a composite material of a resin and a ceramic.

The first intra-resonance hole conductor 21 covers the inner surface of the resonance hole 20g. The first external conductor 22 covers nearly the entire region of the second to sixth surfaces 20b to 20f except the first surface 20a. Further, the first external conductor 22 is connected to one end portion of the first intra-resonance hole conductor 21 in the longitudinal direction (through direction), in the second surface 20b. Further, the first external conductor 22 includes a notch portion 22a that is a third surface 20c partially cut in a rectangular manner in the boundary of the third surface 20c with the first surface 20a.

The first coupling electrode 23 is provided in an approximately central portion of the first surface 20a, and is arranged to extend from the other end portion of the first intra-resonance hole conductor 21 in the longitudinal direction to the outer peripheral edge of the first surface 20a. The size of the first coupling electrode 23 can be appropriately set according to a necessary characteristic, and is set to be 10×10 mm in the present embodiment.

The first input/output electrode 24 is arranged across the first surface 20a and the third surface 20c. The first input/output electrode 24 on the first surface 20a is formed into an approximately T-shape, and is arranged away from the first coupling electrode 23 at a predetermined distance near the third surface 20c. With this arrangement, the first input/output electrode 24 becomes able to be capacitively coupled with the first coupling electrode 23. A first input/output terminal portion 24a of the first input/output electrode 24 is arranged in the third surface 20c. The first input/output terminal portion 24a is arranged to be isolated from the first external conductor 22 so as not to come in contact with the first external conductor 22 inside the notch portion 22a of the first external conductor 22 (in the exposed portion of the third surface 20c).

Note that all of the first intra-resonance hole conductor 21, the first external conductor 22, the first coupling electrode 23, and the first input/output electrode 24 described above are formed of silver. However, the material is not limited to silver, and may be, for example, copper or another conductive material.

The second ¼ wavelength dielectric resonance component 3 includes a second dielectric block 30, a second intra-resonance hole conductor 31, a second external conductor 32, a second coupling electrode 33, and a second input/output electrode 34, and is arranged in a position at a transmission distance D from the first ¼ wavelength dielectric resonance component 2.

Note that the second dielectric block 30, the second intra-resonance hole conductor 31, the second external conductor 32, the second coupling electrode 33, and the second input/output electrode 34 have the same configurations as the first dielectric block 20, the first intra-resonance hole conductor 21, the first external conductor 22, the first coupling electrode 23, and the first input/output electrode 24, and therefore a description thereof is omitted here, by citing the above description of the first ¼ wavelength dielectric resonance component 2.

The substrate 4 is formed of a rigid resin, and includes a first substrate 40 on which the first ¼ wavelength dielectric resonance component 2 is mounted, and a second substrate 41 on which the second ¼ wavelength dielectric resonance component 3 is mounted.

A ground electrode 42 is formed on a surface 40a of the first substrate 40 on which the first ¼ wavelength dielectric resonance component 2 is mounted, and the first external conductor 22 on the third surface 20c of the first ¼ wavelength dielectric resonance component 2 is surface-mounted on the ground electrode 42 by soldering or the like. Further, a signal line 43 connected to an external circuit is formed on a surface 40b at the side opposite to the surface 40a of the first substrate 40 on which the first ¼ wavelength dielectric resonance component 2 is mounted, and the signal line 43 is connected to the first input/output terminal portion 24a of the first input/output electrode 24 through a via 44 provided to stand toward the surface 40a on which the first ¼ wavelength dielectric resonance component 2 is mounted.

A ground electrode 45 is formed on a surface 41a of the second substrate 41 on which the second ¼ wavelength dielectric resonance component 3 is mounted, and the second external conductor 32 on the third surface 30c of the second ¼ wavelength dielectric resonance component 3 is surface-mounted on the ground electrode 45 by soldering or the like. Further, a signal line 46 connected to an external circuit is formed on a surface 41b at the side opposite to the surface 41a of the second substrate 41 on which the second ¼ wavelength dielectric resonance component 3 is mounted. The signal line 46 is connected to a second input/output terminal portion 34a of the second input/output electrode 34 through a via 47 provided to stand toward the surface 41a on which the second ¼ wavelength dielectric resonance component 3 is mounted.

The first ¼ wavelength dielectric resonance component 2 and the second ¼ wavelength dielectric resonance component 3 configured as described above are arranged at the transmission distance D so that the first surface 20a and the first surface 30a face each other. Then, for example, a signal (a transmission object of a frequency having a ¼ wavelength and which resonates) input (supplied or transmitted by communication) through the signal line 43 of the first substrate 40 on which the first ¼ wavelength dielectric resonance component 2 is mounted resonates at the resonance frequency defined by the ¼ wavelength. Accordingly, the first coupling electrode 23 and the second coupling electrode 33 are capacitively coupled, and similar resonance is excited at the second ¼ wavelength dielectric resonance component 3 side. The excited resonance is taken out of the second input/output terminal 34a, and is transmitted to the signal line 46 of the second substrate 41 on which the second ¼ wavelength dielectric resonance component 3 is mounted.

Figure 5:
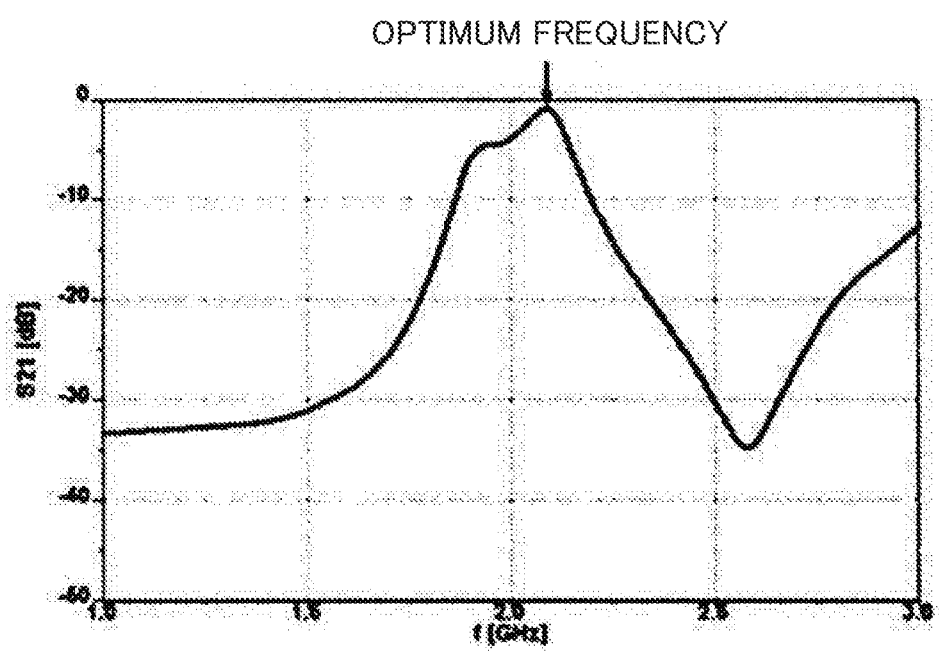
FIG. 5 is a diagram illustrating a transmission characteristic where a transmission interval is D=3 mm.

Here, the relationship between the transmission distance D (mm), and the transmission efficiency (%) and the optimum frequency (MHz) will be described with reference to FIG. 5. FIG. 5 is a diagram illustrating a transmission characteristic where the transmission interval is D=3 mm.

A device similar to the dielectric contactless transmission device 1 according to the first embodiment was prepared, and an experiment to measure the transmission efficiency (%) and the optimum frequency (MHz) while changing the transmission distance D (mm) was conducted. The relationship between the distance between the first surface of the first ¼ wavelength dielectric resonance component and the first surface of the second ¼ wavelength dielectric resonance component (the transmission distance D (mm)), and the transmission efficiency (%) and the optimum frequency (MHz) of the contactless transmission device is illustrated in Table 1. Note that, as illustrated in FIG. 5, the optimum frequency refers to the frequency of when passing loss is the smallest (of the top of a peak).

TABLE 1

| Transmission distance D [mm] | Optimum frequency [MHz] | Transmission efficiency [%] |
|---|---|---|
| 1.0 | 2130 | 96.4 |
| 2.0 | 2110 | 94.5 |
| 3.0 | 2085 | 89.2 |
| 4.0 | 2075 | 83.8 |
| 5.0 | 2065 | 77.2 |
| 6.0 | 2055 | 70.4 |

As illustrated in Table 1, it is found that the transmission efficiency becomes 96.4% and the efficiency is the most favorable when the transmission distance D=1 mm. Further, it is also found that the transmission efficiency is decreased and the optimum frequency becomes lower as the transmission distance D becomes larger. It is found that the transmission efficiency is still 70% or more when the transmission distance D=6 (mm).

Further, the frequency characteristic illustrated in FIG. 5 exhibits a band-pass filter characteristic. Therefore, it is found that it is difficult to transmit a signal in a frequency band other than the transmission frequency (near the optimum frequency). Accordingly, it is found that the contactless transmission device according to the present embodiment also has a function to suppress noises or higher harmonics other than the transmission frequency band.

As described above, the dielectric contactless transmission device 1 according to the first embodiment includes the pair of ¼ wavelength dielectric resonance components 2 and 3, and the pair of ¼ wavelength dielectric resonance components 2 and 3 is configured from the first and second dielectric blocks 20 and 30 formed of ceramic blocks, the conductors 21, 22, 31, and 32 and the electrodes 23 and 33 formed of silver electrodes. Therefore, the dielectric contactless transmission device 1 can be cheaply formed.

Further, in the dielectric contactless transmission device 1, the pair of dielectric resonance components is formed to have the ¼ wavelength with respect to the wavelength of the resonance frequency. Therefore, the dielectric resonance components can be downsized. Accordingly, the dielectric contactless transmission device itself can be downsized. For example, the dielectric contactless transmission device can be formed to have a size of about 20 mm×20 mm×20 mm, like the dielectric contactless transmission device 1 according to the present embodiment.

Further, the field intensity of the open end surfaces (the first surface 20a and the first surface 30a) of the pair of ¼ wavelength dielectric resonance components 2 and 3 is strongest, and thus the pair of ¼ wavelength dielectric resonance components 2 and 3 can be easily capacitively coupled by facing each other.

Therefore, in the present embodiment, the very small and cheap dielectric contactless transmission device 1 with favorable transmission efficiency can be provided. Especially, the transmission distance D is 0.1 mm≤D≤the distance X or the distance Y, and this can be said to be practical.

Further, the dielectric contactless transmission device 1 according to the present embodiment can change the mounting directions of the pair of ¼ wavelength dielectric resonance components 2 and 3 with respect to the substrate 4 by changing the arrangement of the first and second input/output terminal portions 24a and 34a. Therefore, favorable mounting to the substrate in accordance with the transmission direction becomes possible.

SECOND EMBODIMENT

Next, a dielectric contactless transmission device 1A according to the second embodiment of the present invention will be described with reference to FIGS. 6 to 9. The dielectric contactless transmission device 1A according to the second embodiment is different from the first embodiment in that an excitation hole approximately parallel to a resonance hole is provided in a dielectric block. Therefore, in the second embodiment, the excitation hole will be mainly described, and configurations similar to those of the first embodiment are denoted with the same reference signs and a description thereof is omitted.

Figure 6:
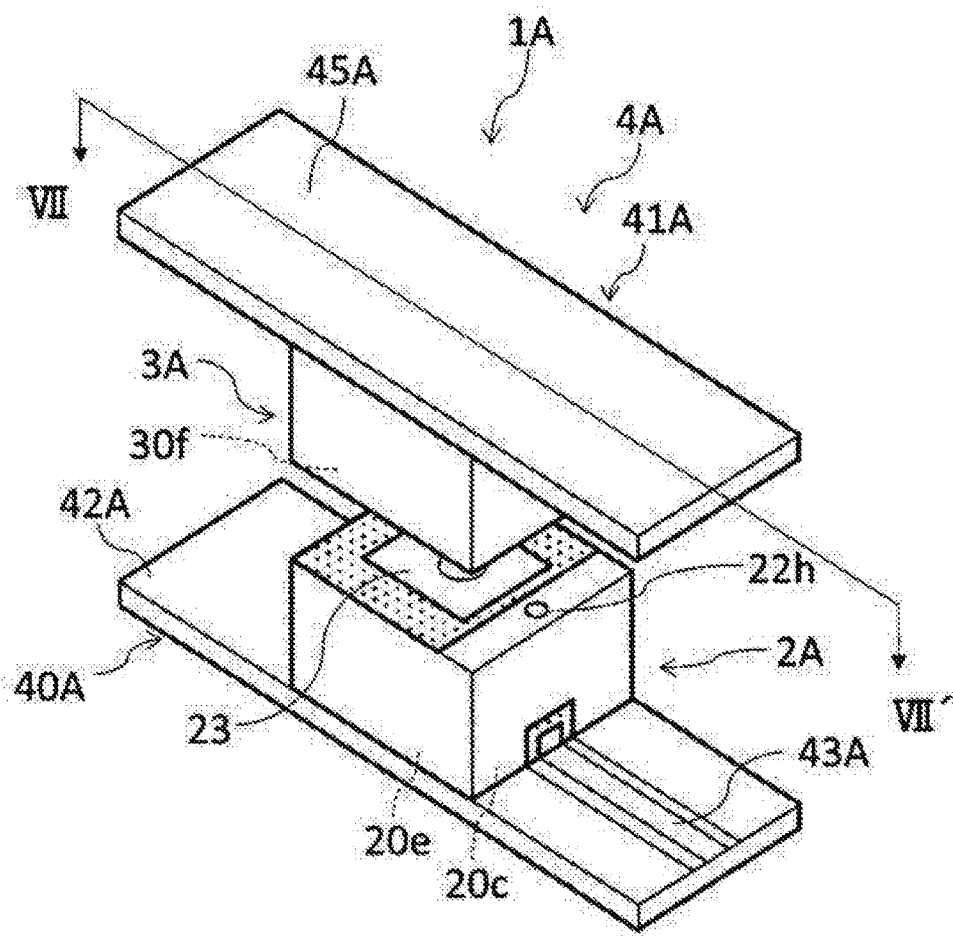
FIG. 6 is a perspective view schematically illustrating a dielectric contactless transmission device according to a second embodiment of the present invention.
Figure 7:
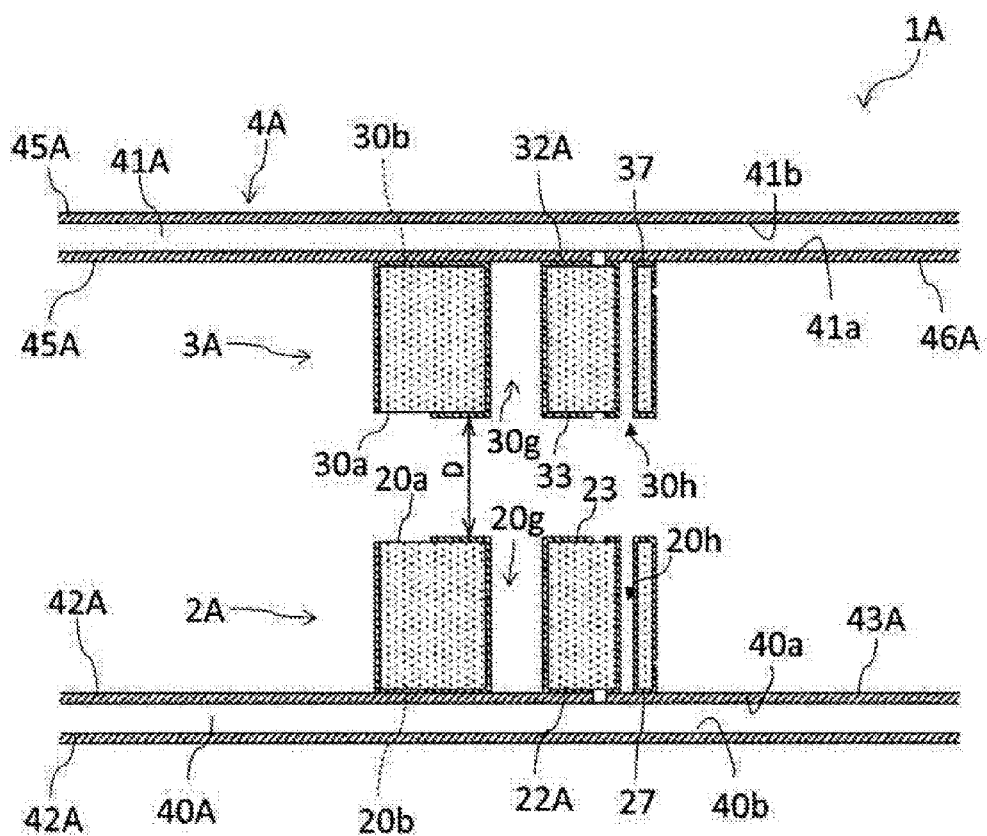
FIG. 7 is the VII-VII' sectional view of the dielectric contactless transmission device illustrated in FIG. 6.
Figure 8:
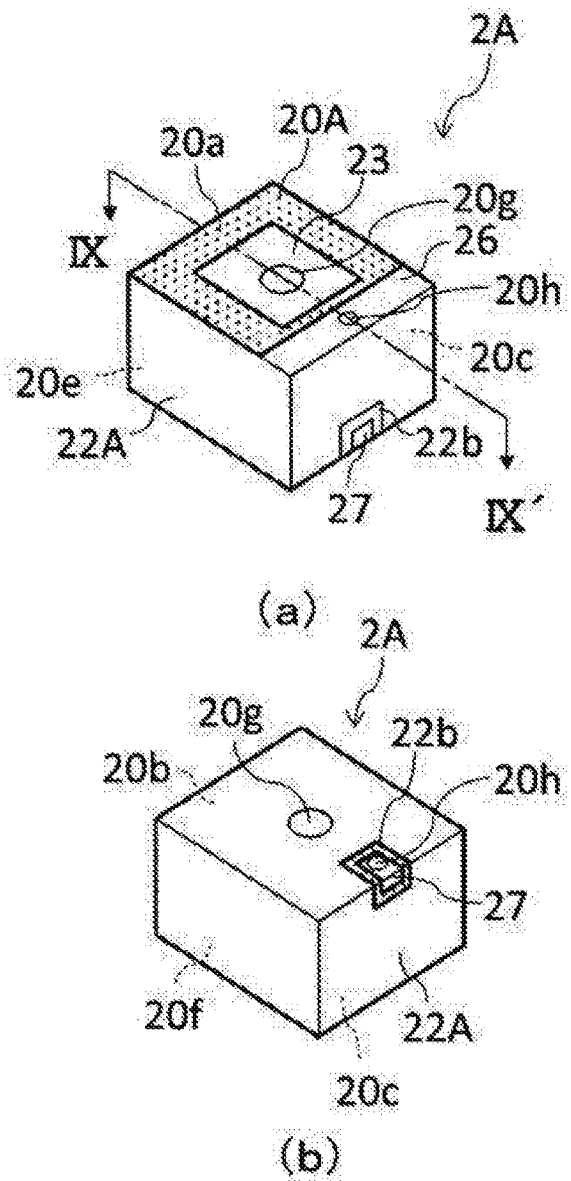
FIGS. 8(a) and 8(b) are perspective views schematically illustrating a first ¼ wavelength dielectric resonance component according to the second embodiment.
Figure 9:
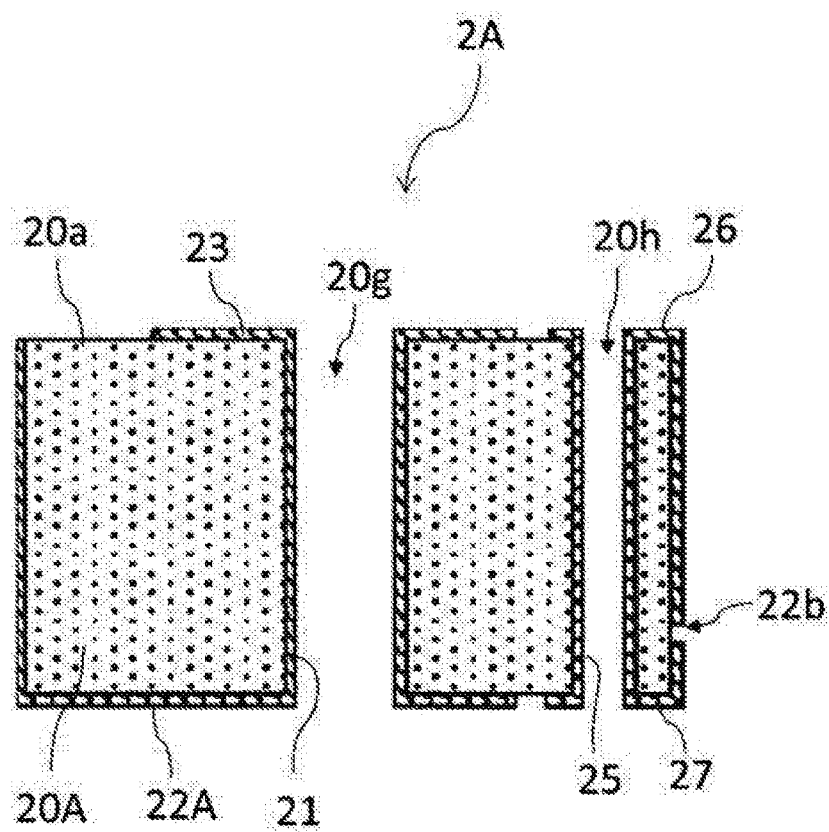
FIG. 9 is the IX-IX' sectional view of the first ¼ wavelength dielectric resonance component illustrated in FIG. 8(a).

FIG. 6 is a perspective view schematically illustrating the dielectric contactless transmission device 1A according to the second embodiment of the present invention. FIG. 7 is the VII-VII' sectional view of the dielectric contactless transmission device 1A illustrated in FIG. 6. FIGS. 8(a) and 8(b) are perspective views schematically illustrating a first ¼ wavelength dielectric resonance component 2A according to the second embodiment. FIG. 9 is the IX-IX' sectional view of the first ¼ wavelength dielectric resonance component 2A illustrated in FIG. 8(a).

As illustrated in FIGS. 6 and 7, the dielectric contactless transmission device 1A includes the first ¼ wavelength dielectric resonance component 2A and a second ¼ wavelength dielectric resonance component 3A (a pair of ¼ wavelength dielectric resonance components) that are formed to have a ¼ wavelength with respect to the resonance frequency, and a substrate 4A on which the first ¼ wavelength dielectric resonance component 2A and the second ¼ wavelength dielectric resonance component 3A are mounted.

As illustrated in FIGS. 8(a) and (b) and FIG. 9, the first ¼ wavelength dielectric resonance component 2A includes a first dielectric block 20A, a first intra-resonance hole conductor 21, a first external conductor 22A, a first coupling electrode 23, a first intra-excitation hole conductor 25, a first short-circuit electrode 26, and a first input/output terminal 27.

The first dielectric block 20A includes a first surface 20a and a second surface 20b, a third surface 20c and a fourth surface 20d, a fifth surface 20e and a sixth surface 20f, a resonance hole 20g, and an excitation hole 20h provided approximately parallel to the resonance hole 20g and making the first surface 20a and the second surface 20b communicate.

The excitation hole 20h configures a through hole that penetrates the interior of the first dielectric block 20A approximately in parallel to the third to sixth surfaces 20c to 20f from the first surface 20a to the second surface 20b. Further, the excitation hole 20h is provided at the side of the third surface 20c with respect to the resonance hole 20g.

The first external conductor 22A covers nearly the entire region of the second to sixth surfaces 20b to 20f but not the first surface 20a. Further, the first external conductor 22A is connected to one end portion of the first intra-resonance hole conductor 21 in the longitudinal direction (through direction), in the second surface 20b. Further, the first external conductor 22A includes a notch portion 22b for continuously exposing the peripheral region of the excitation hole 20h in the second surface 20b, and a part of the third surface 20c adjacent to the peripheral region.

The first intra-excitation hole conductor 25 covers the inner surface of the excitation hole 20h. The first short-circuit electrode 26 is arranged on the first surface 20a and is connected to the first external conductor 22A in a state of being isolated from the first coupling electrode 23. Further, the first short-circuit electrode 26 is connected to one end portion of the first intra-excitation hole conductor 25 in the longitudinal direction (through direction). The first input/output terminal 27 is arranged to be isolated from the first external conductor 22A so as not to come in contact with the first external conductor 22A, inside the notch portion 22b of the first external conductor 22A (in the exposed portion of the second surface 20b and the third surface 20c), and is connected to the other end portion of the first intra-excitation hole conductor 25. Further, the first input/output terminal 27 is arranged across the second surface 20b and the third surface 20c.

The second ¼ wavelength dielectric resonance component 3A includes a second dielectric block 30A, a second intra-resonance hole conductor 31, a second external conductor 32A, a second coupling electrode 33, a second intra-excitation hole conductor 35, a second short-circuit electrode 36, and a second input/output terminal 37, and is arranged in a position at a transmission distance D from the first ¼ wavelength dielectric resonance component 2A.

Note that the second dielectric block 30A, the second external conductor 32A, the second intra-excitation hole conductor 35, the second short-circuit electrode 36, and the second input/output terminal 37 have the same configurations as the first dielectric block 20A, the first external conductor 22A, the first intra-excitation hole conductor 25, the first short-circuit electrode 26, and the first input/output terminal 27. Therefore, a description thereof is omitted here, by citing the above description of the first ¼ wavelength dielectric resonance component 2A.

The substrate 4A is formed of a rigid resin, and includes a first substrate 40A on which the first ¼ wavelength dielectric resonance component 2A is mounted, and a second substrate 41A on which the second ¼ wavelength dielectric resonance component 3A is mounted.

A ground electrode 42A is formed on a surface 40a of the first substrate 40A on which the first ¼ wavelength dielectric resonance component 2A is mounted, and the second external conductor 22A on the second surface 20b of the first ¼ wavelength dielectric resonance component 2A is surface-mounted on the ground electrode 42A by soldering or the like. Further, a signal line 43A connected to an external circuit is also formed on the surface 40a of the first substrate 40A on which the first ¼ wavelength dielectric resonance component 2A is mounted, and the signal line 43A is connected to the first input/output terminal 27 provided on the second surface 20b of the first ¼ wavelength dielectric resonance component 2A, the first input/output terminal 27 being mounted by soldering or the like. Further, a ground electrode 42A is formed on a surface 40b at the side opposite to the surface 40a on which the first ¼ wavelength dielectric resonance component 2A is mounted.

A ground electrode 45A is formed on a surface 41a of the second substrate 41A on which the second ¼ wavelength dielectric resonance component 3A is mounted, and the second external conductor 32A on a second surface 30b of the second ¼ wavelength dielectric resonance component 3A is surface-mounted on the ground electrode 45A by soldering or the like. Further, a signal line 46A connected to an external circuit is formed on the surface 41a of the second substrate 41A on which the second ¼ wavelength dielectric resonance component 3A is mounted, and the signal line 46A is connected to the second input/output terminal 37 provided on the second surface 30b of the second ¼ wavelength dielectric resonance component 3A, the second input/output terminal 37 being mounted by soldering or the like. Further, the ground electrode 45A is formed on a surface 41b at the side opposite to the surface 41a on which the second ¼ wavelength dielectric resonance component 3A is mounted.

When the first ¼ wavelength dielectric resonance component 2A and the second ¼ wavelength dielectric resonance component 3A configured as described above are arranged at the transmission distance D so that the first surface 20a and the first surface 30a face each other, the first substrate 40A and the second substrate 41A become parallel to each other. That is, the first substrate 40A and the second substrate 41A can be arranged to become parallel to each other. Then, for example, a signal (a transmission object of a frequency having a ¼ wavelength and which resonates) input (for example, supplied or transmitted by communication) through the signal line 43A of the first substrate 40A on which the first ¼ wavelength dielectric resonance component 2A is mounted resonates at a resonance frequency defined by the ¼ wavelength through the excitation hole 20h inductively coupled with a resonator. Accordingly, the first coupling electrode 23 and the second coupling electrode 33 are capacitively coupled, and similar resonance is excited at the second ¼ wavelength dielectric resonance component 3A side.

The excited resonance is taken out of the second input/output terminal 37 through the excitation hole 30h inductively coupled with a resonator, and is transmitted to the signal line 46A of the second substrate 41A on which the second ¼ wavelength dielectric resonance component 3A is mounted.

As described above, the dielectric contactless transmission device 1A according to the second embodiment is provided with the first input/output terminal 27 and the second input/output terminal 37 on the second surfaces 20b and 30b, thereby to arrange the first substrate 40A and the second substrate 41A to be in parallel with each other. Therefore, for example, even if the substrates are arranged in parallel, the first ¼ wavelength dielectric resonance component 2A and the second ¼ wavelength dielectric resonance component 3A can be favorably mounted.

Embodiments of the present invention have been described. However, the present invention is not limited to the above-described embodiments, and changes can be appropriately made. Further, the effects described in the embodiments of the present invention are merely the most favorable effects arising from the present invention, and the effects according to the present invention are not limited to those described in the embodiments of the present invention.

For example, in the present embodiment, a description has been given using the first dielectric block 20 and the second dielectric block 30 formed into an approximately rectangular parallelepiped shape. However, the present invention is not limited thereto. The first dielectric block and the second dielectric block may have a rectangular parallelepiped shape, or may have a columnar shape in which the first surface and the second surface have a circular shape, or a polygonal prism shape in which the first surface and the second surface have a polygonal shape.

Further, in the present embodiment, a description has been given with the first coupling electrode and the second coupling electrode having an approximately square external shape. However, the present invention is not limited thereto. The external shapes of the first coupling electrode and the second coupling electrode may be appropriately changed as long as the necessary coupling can be obtained, and for example, a rectangular parallelepiped shape, a circular shape, or a polygonal shape may be employed.

The present application is based on Japanese Patent Application No. 2014-130039 (filed on Jun. 25, 2014), and claims the benefit of priority under the Paris Convention based on Japanese Patent Application No. 2014-130039. The disclosed content of Japanese Patent application 2014-130039 is incorporated herein by reference in its entirety.

Representative embodiments of the present invention have been described in detail. However, various changes, substitutions, and alternatives being made should be understood without departing from the spirit and the scope of the invention defined by claims. Further, even if the claims are amended in the application procedure, the inventors intend to maintain equivalents of the claimed invention.

The invention claimed is:
1. A dielectric contactless transmission device capable of transmitting a transmission object in a non-contact manner, the dielectric contactless transmission device comprising:
　a pair of ¼ wavelength dielectric resonance components, each of the ¼ wavelength dielectric resonance components including
　a dielectric block including one surface, another surface positioned at the side opposite to the one surface, a connection surface that connects an outer peripheral edge of the one surface and an outer peripheral edge of the other surface, and a resonance hole that makes the one surface and the other surface communicate;
　an intra-resonance hole conductor covering an inner surface of the resonance hole;
　an external conductor covering the other surface and the connection surface of the dielectric block, and connected to one end of the intra-resonance hole conductor; and
　a coupling electrode arranged on the one surface in a state of being isolated from the external conductor, and connected to the other end of the intra-resonance hole conductor, wherein
　the one surfaces are arranged to face each other so that the coupling electrodes of the pair of ¼ wavelength dielectric resonance components are capacitively coupled.

2. The dielectric contactless transmission device according to claim 1, wherein
　at least one of the pair of ¼ wavelength dielectric resonance components includes an input/output electrode arranged on the one surface to be isolated from the external conductor, and capacitively coupled with the coupling electrode, and the input/output electrode is connected to an external circuit.

3. The dielectric contactless transmission device according to claim 2, wherein the external conductor includes a notch portion exposing a part of the connection surface, the input/output electrode includes an input/output terminal portion arranged to be isolated from the external conductor, inside the notch portion, and the input/output terminal portion is connected to the external circuit.

4. The dielectric contactless transmission device according to claim 1, wherein at least one of the pair of ¼ wavelength dielectric resonance components includes an excitation hole making the one surface and the other surface communicate approximately in parallel to the resonance hole, and inductively coupled with a resonator configured from the dielectric block, and an intra-excitation hole conductor covering the inner surface of the excitation hole, and connected to an external circuit.

5. The dielectric contactless transmission device according to claim 4, wherein the external conductor includes a notch portion continuously exposing a part of the other surface and a part of the connection surface, an input/output terminal portion is arranged to be isolated from the external conductor, inside the notch portion, and connected to the intra-excitation hole conductor, and the input/output terminal portion is connected to the external circuit.

6. A contactless transmission method for enabling transmission of a transmission object in a non-contact manner, the method comprising:

arranging one surface of a first ¼ wavelength dielectric resonance component including a first dielectric block including one surface, another surface positioned at the side opposite to the one surface, a connection surface connecting an outer peripheral edge of the one surface and an outer peripheral edge of the other surface, and a resonance hole making the one surface and the other surface communicate, a first intra-resonance hole conductor covering an inner surface of the resonance hole, a first external conductor covering the other surface and the connection surface of the first dielectric block, and connected to one end of the first intra-resonance hole conductor, and a first coupling electrode arranged on the one surface and connected to the other end of the first intra-resonance hole conductor, and one surface of a second ¼ wavelength dielectric resonance component including a second dielectric block including one surface, another surface positioned at the side opposite to the one surface, a connection surface connecting an outer peripheral edge of the one surface and an outer peripheral edge of the other surface, and a resonance hole making the one surface and the other surface communicate, a second intra-resonance hole conductor covering an inner surface of the resonance hole, a second external conductor covering the other surface and the connection surface of the second dielectric block, and connected to one end of the second intra-resonance hole conductor, and a second coupling electrode arranged on the one surface and connected to the other end of the second intra-resonance hole conductor, to face each other; and capacitively coupling the first coupling electrode and the second coupling electrode, and transmitting the transmission object.

* * * * *